United States Patent
Nabeto et al.

(10) Patent No.: US 12,243,310 B2
(45) Date of Patent: Mar. 4, 2025

(54) ARTICLE DETERMINATION USING IMAGE PROCESSING

(71) Applicant: NEC Corporation, Tokyo (JP)

(72) Inventors: Yu Nabeto, Tokyo (JP); Katsumi Kikuchi, Tokyo (JP); Soma Shiraishi, Tokyo (JP); Takami Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 405 days.

(21) Appl. No.: 17/797,944

(22) PCT Filed: Feb. 20, 2020

(86) PCT No.: PCT/JP2020/006733
§ 371 (c)(1),
(2) Date: Aug. 5, 2022

(87) PCT Pub. No.: WO2021/166146
PCT Pub. Date: Aug. 26, 2021

(65) Prior Publication Data
US 2023/0064123 A1    Mar. 2, 2023

(51) Int. Cl.
*G06V 20/50* (2022.01)
*G06T 7/62* (2017.01)
(Continued)

(52) U.S. Cl.
CPC .............. *G06V 20/50* (2022.01); *G06V 10/12* (2022.01); *G06V 10/22* (2022.01)

(58) Field of Classification Search
CPC ........ G06V 20/50; G06V 10/12; G06V 10/22; G06V 10/764; G06V 20/52; G06V 10/25; G06T 7/62
See application file for complete search history.

(56) References Cited

U.S. PATENT DOCUMENTS 10,007,858 B2 *  6/2018  Bremer ................. G06V 10/17
2015/0206119 A1   7/2015  Urushibata
(Continued)

FOREIGN PATENT DOCUMENTS

JP    2002-013913 A    1/2002
JP    2015-138349 A    7/2015
(Continued)

OTHER PUBLICATIONS

International Search Report for PCT Application No. PCT/JP2020/006733, mailed on May 19, 2020.

*Primary Examiner* — Siamak Harandi
*Assistant Examiner* — Helen Deng Shi
(74) *Attorney, Agent, or Firm* — Sughrue Mion, PLLC (57) ABSTRACT

An article determination apparatus (10) is used with two image capture units (20). One image capture unit (20), an article shelf (40), and the other image capture unit (20) are arranged in this order. The acquisition unit (110) acquires images generated by the two image capture units (20). The image processing unit (120) generates first size data and second size data by processing the images acquired by the acquisition unit (110). The first size data and the second size data indicate the size of an area in which an article is captured in an image generated by one image capture unit (20) and by the other image capture unit (20), respectively. The determination unit (130) determines that an estimation result of the article name of the article by image processing is correct when a relation between the first size data and the second size data satisfies a criterion.

12 Claims, 7 Drawing Sheets

(51) Int. Cl.
  *G06V 10/12*   (2022.01)
  *G06V 10/22*   (2022.01)

(56)          References Cited

U.S. PATENT DOCUMENTS

2019/0087663 A1\*   3/2019   Yamazaki .............. G06V 20/52
2019/0220692 A1\*   7/2019   Wu .................... G06F 18/2413
2020/0012878 A1    1/2020   Iio et al.

FOREIGN PATENT DOCUMENTS

JP      2019-526848 A     9/2019
WO      2018/151008 A1    8/2018

\* cited by examiner

ARTICLE DETERMINATION USING IMAGE PROCESSING

This application is a National Stage Entry of PCT/JP2020/006733 filed on Feb. 20, 2020, the contents of all of which are incorporated herein by reference, in their entirety.

TECHNICAL FIELD

The present invention relates to an article determination apparatus, an article determination method, and a program.

BACKGROUND ART

Determination of an article such as a product by using an image is performed at various locations. As an example, determination of an article taken out from a shelf by a person is performed at stores and warehouses. Then, Patent Document 1 describes performing learning on a plurality of images by using a neural network and determining a classification of a product by using the learning result. In Patent Document 1, a rectangular area including a product is extracted from an image and the aforementioned processing is performed by using the rectangular area.

RELATED DOCUMENT

Patent Document

Patent Document 1: Japanese Translation of PCT International Application Publication No. 2019-526848

SUMMARY OF THE INVENTION

Technical Problem

The present inventor has examined improvement in article determination precision at determination of an article by using image processing. An object of the present invention is to improve article determination precision at determination of an article by using image processing.

Solution to Problem

The present invention provides an article determination apparatus used with a first image capture unit and a second image capture unit each capturing an image of at least one of an article placement area and an area in front of the article placement area, the article determination apparatus including:
- an acquisition unit for acquiring a first image generated by the first image capture unit and acquiring a second image generated by a second image capture unit;
- an image processing unit for generating first size data indicating a size of an area in which an article is captured in the first image and generating second size data indicating a size of an area in which the article is captured in the second image; and
- a determination unit for determining that an estimation result of an article name of the article by image processing using at least one of the first image and the second image is correct when a relation between the first size data and the second size data satisfies a criterion, wherein
- the first image capture unit, the article placement area, and the second image capture unit are arranged in this order in a first direction.

The present invention provides an article determination method performed by a computer used with a first image capture unit and a second image capture unit each capturing an image of at least one of an article placement area and an area in front of the article placement area, the method including, by the computer:
- acquiring a first image generated by the first image capture unit and acquiring a second image generated by a second image capture unit;
- generating first size data indicating a size of an area in which an article is captured in the first image and generating second size data indicating a size of an area in which the article is captured in the second image; and
- determining that an estimation result of an article name of the article by image processing using at least one of the first image and the second image is correct when a relation between the first size data and the second size data satisfies a criterion, wherein
- the first image capture unit, the article placement area, and the second image capture unit are arranged in this order in a first direction.

The present invention provides a program used by a computer used with a first image capture unit and a second image capture unit each capturing an image of at least one of an article placement area and an area in front of the article placement area, the program causing the computer to execute:
- a function of acquiring a first image generated by the first image capture unit and acquiring a second image generated by a second image capture unit;
- a function of generating first size data indicating a size of an area in which an article is captured in the first image and generating second size data indicating a size of an area in which the article is captured in the second image; and
- a function of determining that an estimation result of an article name of the article by image processing using at least one of the first image and the second image is correct when a relation between the first size data and the second size data satisfies a criterion, wherein
- the first image capture unit, the article placement area, and the second image capture unit are arranged in this order in a first direction.

Advantageous Effects of Invention

The present invention enables improvement in article determination precision at determination of an article by using image processing.

BRIEF DESCRIPTION OF THE DRAWINGS

The aforementioned object, other objects, features, and advantages will become more apparent by use of the following preferred example embodiments and accompanying drawings.

DESCRIPTION OF EMBODIMENTS

Example embodiments of the present invention will be described below by using drawings. Note that, in every drawing, similar components are given similar signs, and description thereof is omitted as appropriate.

Figure 1:
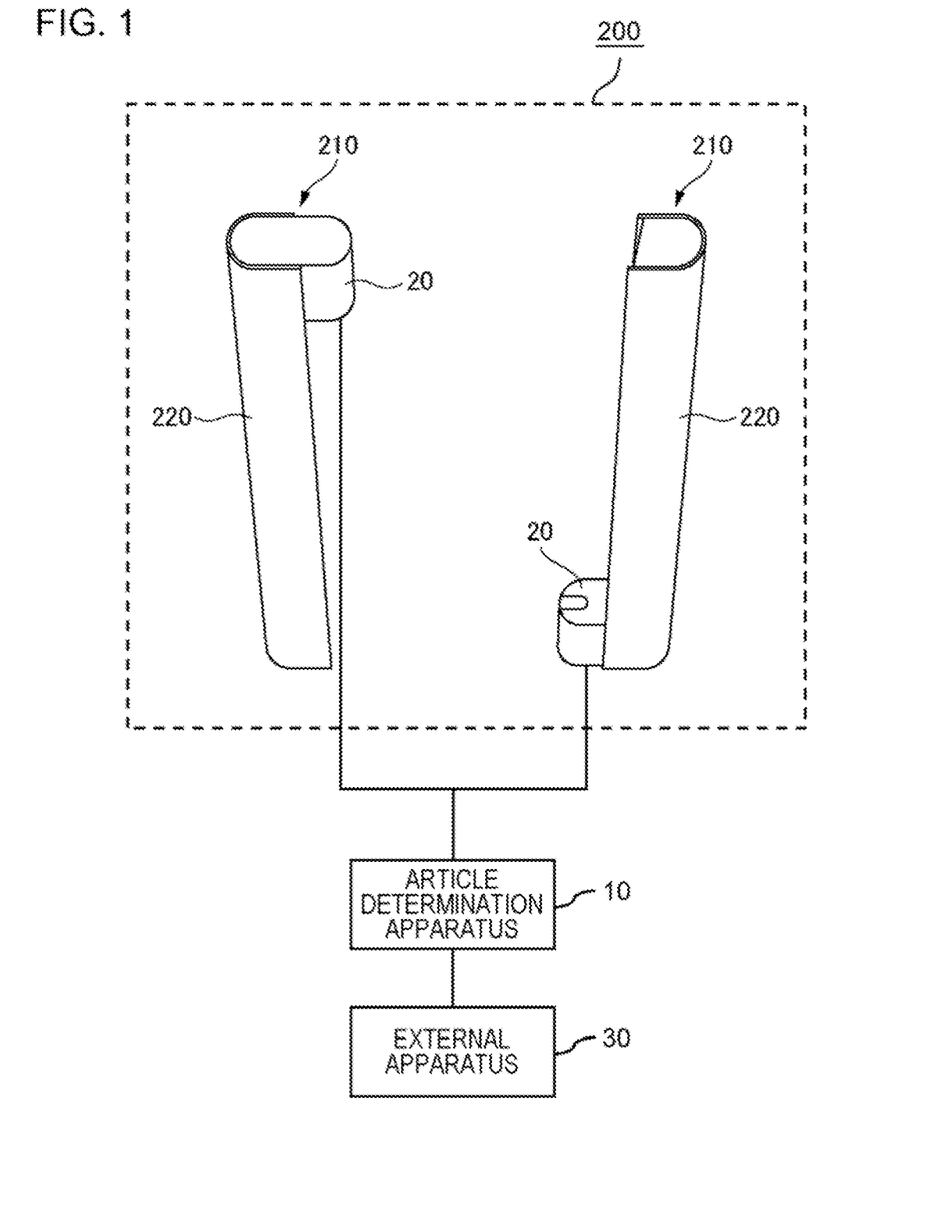
FIG. 1 is a diagram illustrating a use environment of an article determination apparatus according to an example embodiment.
Figure 2:
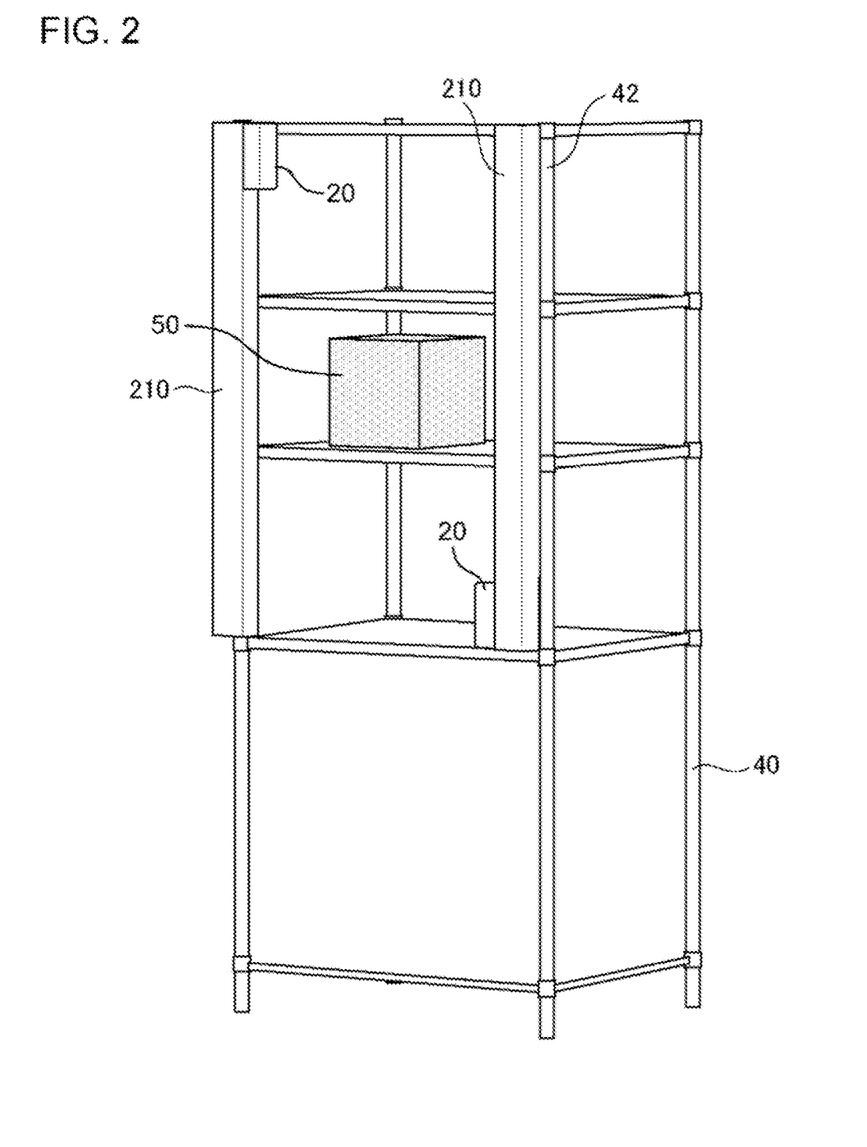
FIG. 2 is a diagram for illustrating an image capture apparatus.

FIG. 1 is a diagram illustrating a use environment of an article determination apparatus 10 according to an example embodiment. FIG. 2 is a diagram for illustrating an image capture apparatus 200. The article determination apparatus 10 determines an article 50 placed on an article shelf 40 or an article 50 taken out from the article shelf 40, by processing an image generated by the image capture apparatus 200.

For example, the article shelf 40 is placed in a store or a warehouse and includes at least one shelf. An article 50 is placed on a shelf. Specifically, a shelf in the article shelf 40 is an example of an article placement area.

The image capture apparatus 200 captures an image of at least one of a shelf in the article shelf 40 and an area in front of the shelf. In the example illustrated in FIG. 2, the image capture apparatus 200 captures an image of both a shelf in the article shelf 40 and an area in front of the shelf. The image capture apparatus 200 includes two image capturing units 210. Each of the two image capturing units 210 includes a lighting unit 220 and an image capture unit 20. One image capture unit 20 is an example of a first image capture unit, and the other image capture unit 20 is an example of a second image capture unit.

A light emitting surface of the lighting unit 220 extends in one direction and includes a light emitting unit and a cover for covering the light emitting unit. The lighting unit 220 mainly emits light in a direction orthogonal to the extending direction of the light emitting surface. The light emitting unit includes a light emitting device such as an LED and emits light in a direction not being covered by the cover. Note that, when the light emitting device is an LED, a plurality of LEDs are arranged in a direction in which the lighting unit 220 extends (a vertical direction in the diagram).

The image capture unit 20 is provided at one end of the lighting unit 220 and has a direction in which light of the lighting unit 220 is emitted as an image capture area. For example, in an image capturing unit 210 on the left side in FIG. 1 and FIG. 2, the image capture unit 20 has a lower area and a diagonally lower right area as an image capture area. Further, in an image capturing unit 210 on the right side in FIG. 1 and FIG. 2, the image capture unit 20 has an upper area and a diagonally upper left area as an image capture area.

As illustrated in FIG. 2, the two image capturing units 210 are mounted on front frames 42 (or at the front of side walls on both sides) of the article shelf 40. At this time, a first image capturing unit 210 is mounted on one front frame 42 and is oriented in such a way that the image capture unit 20 is positioned in the upper part, and a second image capturing unit 210 is mounted on a front frame 42 on the opposite side of the first image capturing unit 210 and is oriented in such a way that the image capture unit 20 is positioned in the lower part. Therefore, one image capture unit 20, the article shelf 40, and the other image capture unit 20 are arranged in this order in a direction in which the shelf extends (an example of a first direction). Further, one image capture unit 20 is positioned above the shelf in the article shelf 40, and the other image capture unit 20 is positioned below the shelf in the article shelf 40. Thus, the space between the two image capture units 20 is widened.

Then, the image capture unit 20 in the first image capturing unit 210 captures an image of an area below and diagonally below the image capture unit 20 in such a way that the image capture area includes an opening of the article shelf 40 and an area in front of the opening. On the other hand, the image capture unit 20 in the second image capturing unit 210 captures an image of an upper area and a diagonally upper area in such a way that the image capture area includes the opening of the article shelf 40 and the area in front of the opening. Thus using two image capturing units 210 enables image capture of the entire area including the opening of the article shelf 40 and the area in front of the opening. Therefore, processing images generated by the image capture apparatus 200 enables determination of an article taken out from the article shelf 40.

Then, the article determination apparatus 10 outputs information indicating the determined article name of an article 50 to an external apparatus 30.

When the article shelf 40 is placed in a store, the external apparatus 30 may be an apparatus collecting a customer trend for an article 50, such as an apparatus determining a product once being taken in a hand of a customer and then being returned to a shelf, or a product registration apparatus in a point of sale system (POS). In the latter case, an image processing unit 120, to be described later, in the article determination apparatus 10 may extract a facial image or a feature value thereof of a customer taking out an article 50 from the article shelf 40, from an image generated by either of the two image capture units 20, and output the facial image or the feature value to the external apparatus 30 along with information indicating the article name of the article 50 such as a product code.

Further, when the article shelf 40 is placed in a distribution warehouse, for example, the external apparatus 30 is an apparatus managing shipping of articles.

Figure 3:
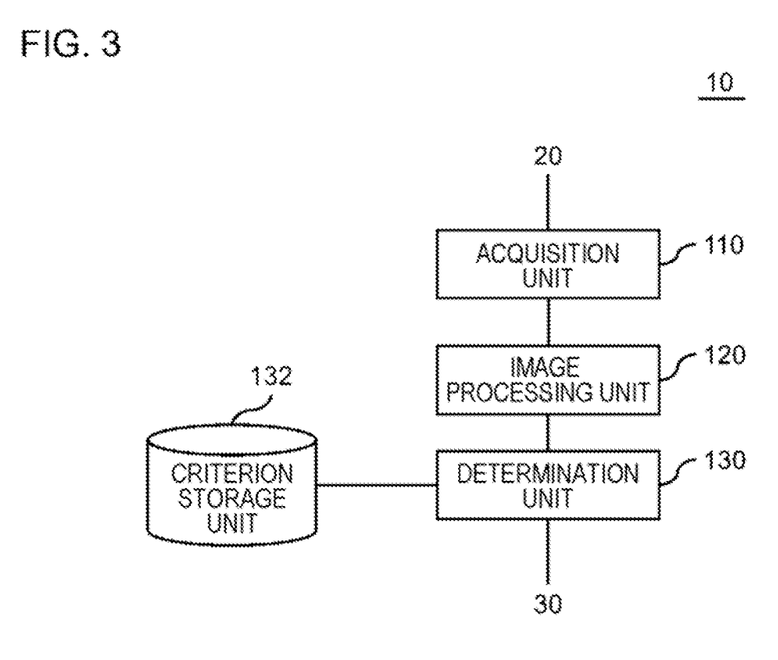
FIG. 3 is a block diagram illustrating an example of a functional configuration of the article determination apparatus.

FIG. 3 is a block diagram illustrating an example of a functional configuration of the article determination apparatus 10. The article determination apparatus 10 includes an acquisition unit 110, the image processing unit 120, and the determination unit 130.

The acquisition unit 110 acquires images generated by the two image capture units 20.

The image processing unit 120 generates first size data and second size data by processing images acquired by the acquisition unit 110. First size data indicate the size of an area in which an article is captured in an image (hereinafter described as a first image) generated by one image capture unit 20 (such as the image capture unit 20 on the right side in FIG. 1 and FIG. 2). Second size data indicate the size of an area in which the article is captured in an image (hereinafter described as a second image) generated by the other image capture unit 20 (such as the image capture unit 20 on the left side in FIG. 1 and FIG. 2). As an example, when an article area is rectangular, each piece of first size data and second size data may be an area of the rectangle or lengths of the long side and the short side of the rectangle. Each of the area and the lengths may be represented by a pixel count.

When a relation between the first size data and the second size data satisfies a criterion, the determination unit 130 determines that an estimation result of the article name of the article by image processing using at least one of the first image and the second image is correct.

The relative position between the two image capturing units 210 is fixed. Therefore, when the size and the position of an article 50 is determined, both first size data and second size data are uniquely determined. Therefore, when the size of the article 50 is determined, the second size data can be computed by a function with the first size data as a variable. The determination unit 130 uses information corresponding to the function as a criterion. Note that, for example, the criterion is generated by using machine learning as will be described later.

In the example illustrated in this diagram, a criterion used by the determination unit 130 is stored in a criterion storage unit 132. The criterion storage unit 132 stores the aforementioned criterion for each article shelf 40, and for each item (such as a PET bottle of a specific size) or article name (such as a product name) of the article 50. In other words, the aforementioned criterion changes when the item of the article 50 changes even when the article shelf 40 does not change. Further, the aforementioned criterion also changes when the relative position between the two image capturing units 210 changes due to a change of the article shelf 40. Note that the criterion storage unit 132 may be part of the article determination apparatus 10 or may be positioned outside the article determination apparatus 10.

Note that, for example, image processing for estimating the article name of an article is performed by the image processing unit 120. The image processing unit 120 may estimate the article name before determining whether a relation between first size data and second size data satisfies a criterion or may estimate the article name after the determination. In the former case, the determination unit 130 reads a criterion related to the estimated article name from the criterion storage unit 132 and uses the criterion.

Figure 4:
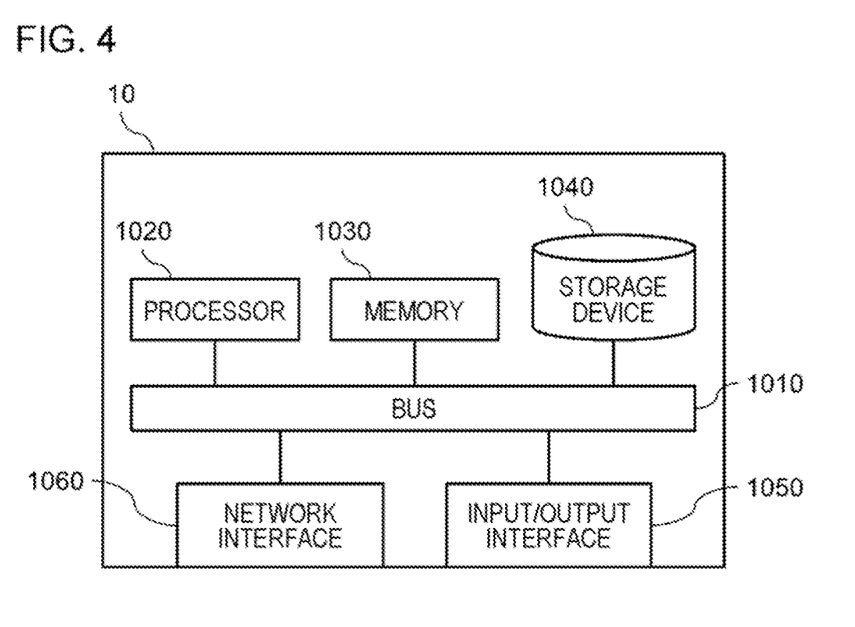
FIG. 4 is a diagram illustrating a hardware configuration example of the article determination apparatus.

FIG. 4 is a diagram illustrating a hardware configuration example of the article determination apparatus 10. The article determination apparatus 10 includes a bus 1010, a processor 1020, a memory 1030, a storage device 1040, an input/output interface 1050, and a network interface 1060.

The bus 1010 is a data transmission channel for the processor 1020, the memory 1030, the storage device 1040, the input/output interface 1050, and the network interface 1060 to 5 transmit and receive data to and from one another. Note that the method of interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules providing the functions of the article determination apparatus 10 (such as the acquisition unit 110, the image processing unit 120, and the determination unit 130). By reading each program module into the memory 1030 and executing the program module by the processor 1020, each function related to the program module is provided. Further, the storage device 1040 also functions as the criterion storage unit 132.

The input/output interface 1050 is an interface for connecting the article determination apparatus 10 to various types of input/output equipment. For example, the article determination apparatus 10 communicates with the image capture apparatus 200 through the input/output interface 1050.

The network interface 1060 is an interface for connecting the article determination apparatus 10 to a network. Examples of the network include a local area network (LAN) and a wide area network (WAN). The method of connecting the network interface 1060 to the network may be a wireless connection or a wired connection. The article determination apparatus 10 may communicate with the image capture apparatus 200 and the external apparatus 30 through the network interface 1060.

Figure 5:
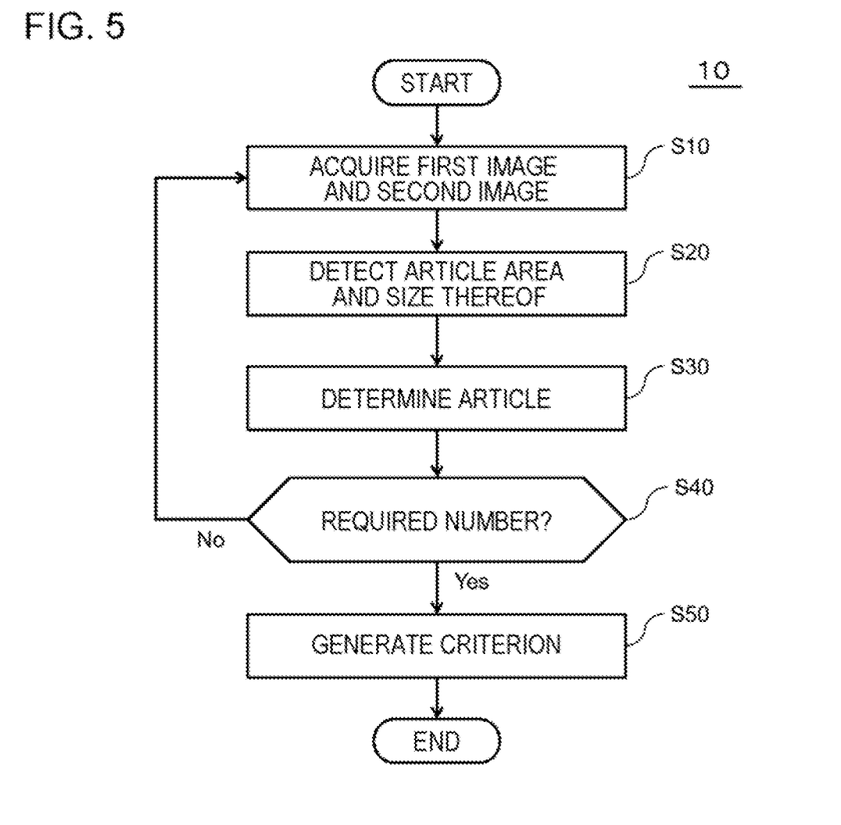
FIG. 5 is a flowchart illustrating an example of a method for generating a criterion stored in a criterion storage unit.

FIG. 5 is a flowchart illustrating an example of a method for generating a criterion stored in the criterion storage unit 132. For example, processing illustrated in this diagram is performed for each combination of an article shelf 40, the article name or the item of an article 50, and the position of the image capture apparatus 200 relative to the article shelf 40. Therefore, the processing illustrated in this diagram is preferably performed for each item (or article name) of an article 50 after the image capture apparatus 200 is mounted on the article shelf 40. Further, in this diagram, a criterion stored in the criterion storage unit 132 is generated by the article determination apparatus 10; however, the criterion may be generated by another apparatus.

First, a user of the article determination apparatus 10 places an article 50 on the article shelf 40 and takes out the article 50 from the article shelf 40. Then, the two image capture units 20 in the image capture apparatus 200 capture images of the article 50 taken out from the article shelf 40 and generate a first image and a second image. The acquisition unit 110 in the article determination apparatus 10 acquires the first image and the second image (Step S10).

Next, the image processing unit 120 in the article determination apparatus 10 extracts an area in which the article 50 is captured (hereinafter described as an article area) from the first image and sets data indicating the size of the article area to first size data. Further, the image processing unit 120 extracts an article area of the article 50 from the second image and sets data indicating the size of the article area to second size data (Step S20).

Then, the image processing unit 120 in the article determination apparatus 10 determines the article name of the article 50 by processing at least one of the first image and the second image (Step S30). For example, the image processing unit 120 determines the article name of the article 50 by using a feature value prepared for each article name of the article 50.

The article determination apparatus 10 includes the first size data, the second size data, and the article name of the article 50 generated by the image processing unit 120 in one piece of training data. Then, the article determination apparatus 10 repeats the processing described in Steps S10 to S30 until a required number of pieces of training data are collected (Step S40). The article 50 is preferably placed at locations different from each other in the article shelf 40 every time Steps S10 to S30 are repeated.

Training data may be provided for each item. In this case, a plurality of pieces of training data for each article name are aggregated for each item.

Subsequently, the article determination apparatus 10 generates the aforementioned criterion by performing machine learning on training data for each article name or item of the article 50 and causes the criterion storage unit 132 to store the criterion (Step S50).

Figure 6:
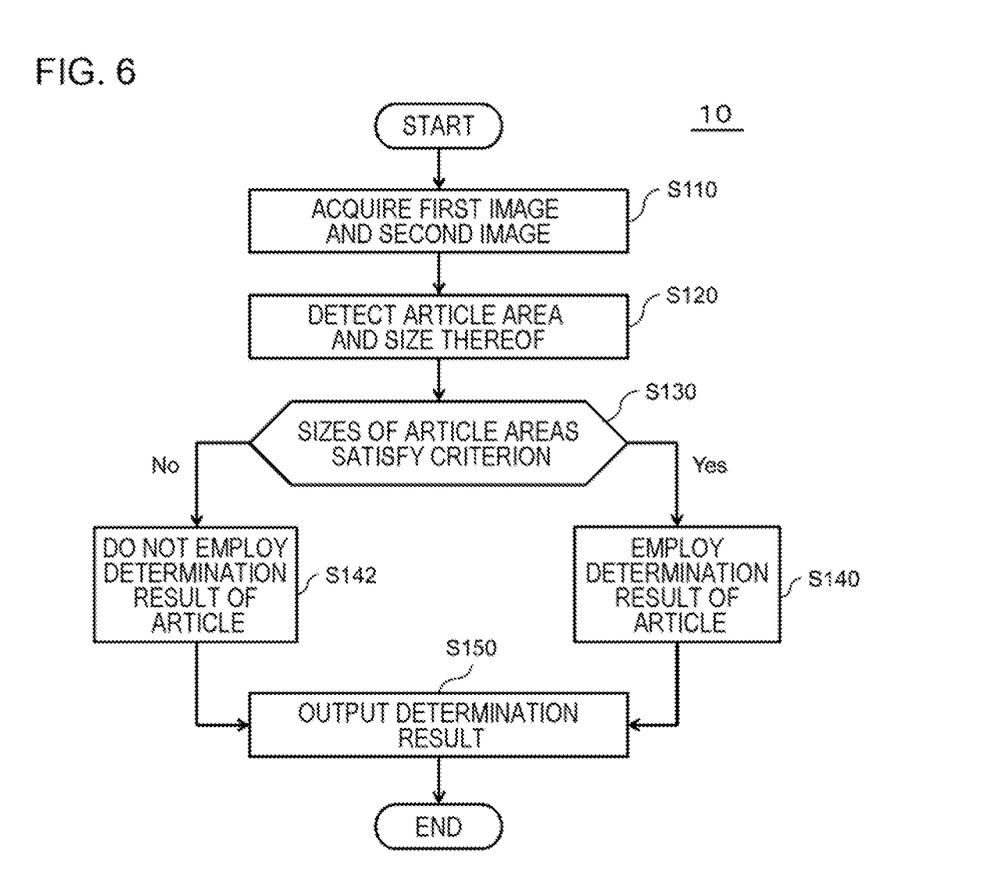
FIG. 6 is a flowchart illustrating a first example of article determination processing performed by the article determination apparatus.

FIG. 6 is a flowchart illustrating a first example of determination processing of an article 50 performed by the article determination apparatus 10. In the example illustrated in this diagram, only articles 50 of identical item and identical size are placed on the article shelf 40. Therefore, only one criterion is required for use by the determination unit 130. The determination unit 130 previously reads the criterion from the criterion storage unit 132.

When a person such as a customer of a store or an employee of a warehouse takes out an article 50 from the article shelf 40, the two image capture units 20 in the image capture apparatus 200 generate a first image and a second image. The acquisition unit 110 in the article determination apparatus 10 acquires the first image and the second image (Step S110). Then, the image processing unit 120 in the article determination apparatus 10 generates first size data and second size data by performing processing similar to Step S20 in FIG. 5 (Step S120). Next, the determination unit 130 determines whether relationship between the first size data and the second size data generated by the image processing unit 120 satisfies the criterion (Step S130). When the criterion is satisfied (Step S130: Yes), the determination unit 130 employs the determination result of the article 50 by image processing (Step S140). On the other hand, when the criterion is not satisfied (Step S130: No), the determination unit 130 does not employ the determination result of the article 50 by the image processing (Step S142). Then, the determination unit 130 outputs the determination result of the article name to the external apparatus 30 (Step S150).

Note that, in the example illustrated in this diagram, a timing at which estimation of the article name of the article 50 is performed by the image processing unit 120 may be any timing after Step S110. For example, the image processing unit 120 may estimate the article name of the article 50 between Step S110 and Step S120 or may estimate the article name of the article 50 after Step S140. In the latter case, when the determination in Step S130 is No, the image processing unit 120 does not perform the estimation processing of the article name of the article 50.

Figure 7:
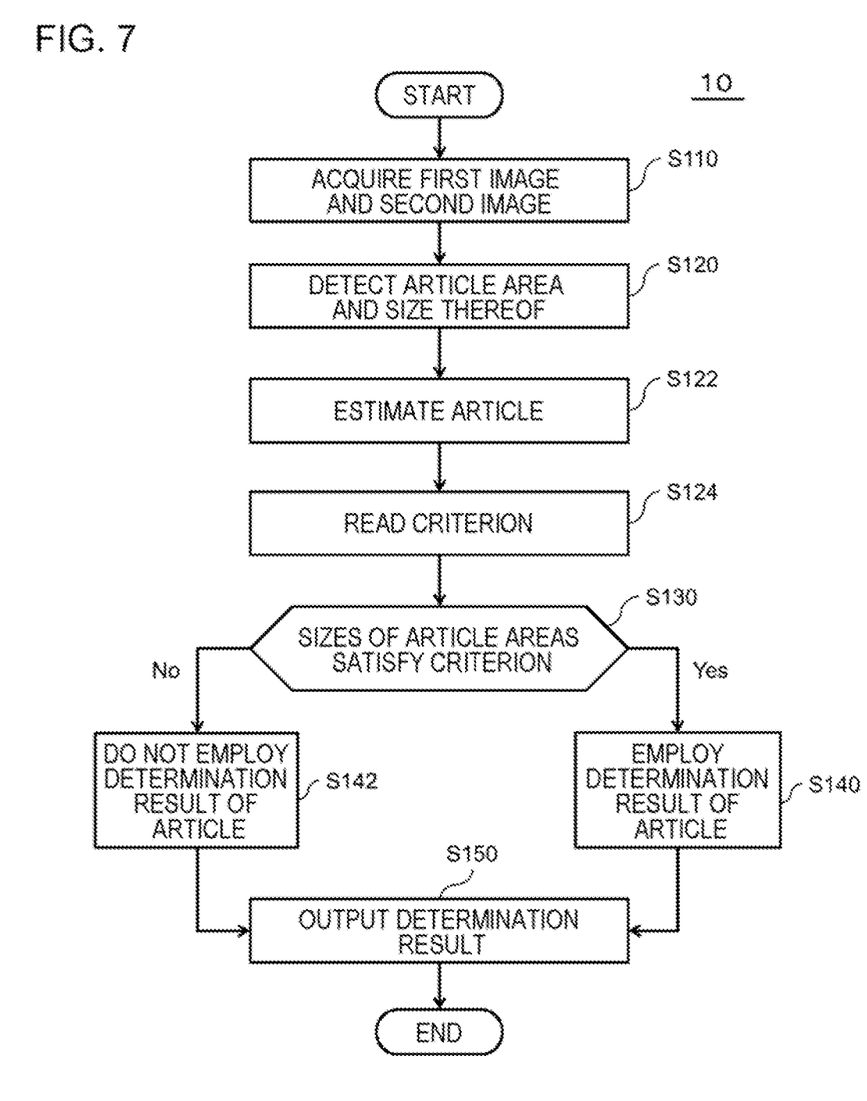
FIG. 7 is a flowchart illustrating a second example of the article determination processing performed by the article determination apparatus.

FIG. 7 is a flowchart illustrating a second example of the determination processing of the article 50 performed by the article determination apparatus 10. Processing performed in Step S110 and Step S120 are similar to that in FIG. 6.

After Step S120, the image processing unit 120 estimates the article name of the article 50 by using at least one of the first image and the second image (Step S122). Then, the determination unit 130 reads a criterion related to the article name estimated by the image processing unit 120 from the criterion storage unit 132 (Step S124).

Subsequent processing (Step S130 to Step S150) is similar to that in FIG. 6.

As described above, the article determination apparatus 10 according to the present example embodiment estimates the article name of an article 50 by using at least one of images captured by the two image capture units 20. The two image capture units 20 are placed in such a way as to sandwich the article shelf 40 in between. Then, the article determination apparatus 10 determines that an estimation result of the item of 50 is correct when a relation between the size of an area in which the article 50 is captured in a first image generated by one image capture unit 20 and the size of an area in which the article 50 is captured in a second image generated by the other image capture unit 20 satisfies a criterion. Therefore, article determination precision is improved at determination of an article by using image processing.

While the example embodiments of the present invention have been described above with reference to the drawings, the example embodiments are exemplifications of the present invention, and various configurations other than those described above may be employed.

Further, while a plurality of processes (processing) are described in a sequential order in each of a plurality of flowcharts used in the aforementioned description, the execution order of processes executed in each example embodiment is not limited to the order of description. The order of the illustrated processes may be modified without affecting the contents in each example embodiment. Further, the aforementioned example embodiments may be combined without contradicting one another.

The whole or part of the example embodiments described above may be described as, but not limited to, the following supplementary notes.

1. An article determination apparatus used with a first image capture unit and a second image capture unit each capturing an image of at least one of an article placement area and an area in front of the article placement area, the article determination apparatus including:
    an acquisition unit for acquiring a first image generated by the first image capture unit and acquiring a second image generated by a second image capture unit;
    an image processing unit for generating first size data indicating a size of an area in which an article is captured in the first image and generating second size data indicating a size of an area in which the article is captured in the second image; and
    a determination unit for determining that an estimation result of an article name of the article by image processing using at least one of the first image and the second image is correct when a relation between the first size data and the second size data satisfies a criterion, wherein
    the first image capture unit, the article placement area, and the second image capture unit are arranged in this order in a first direction.

2. The article determination apparatus according to aforementioned 1, wherein
    the image processing unit estimates an article name of the article by the image processing before the determination unit determines whether the first size data and the second size data satisfy a criterion, and
    the determination unit uses the criterion based on an estimation result of an article name of the article.

3. The article determination apparatus according to aforementioned 1 or 2, wherein
    the first image capture unit is positioned above the article placement area and the second image capture unit is positioned below the article placement area.

4. The article determination apparatus according to any one of aforementioned 1 to 3, wherein
    the criterion is set by using machine learning.

5. An article determination method performed by a computer used with a first image capture unit and a second image capture unit each capturing an image of at least one of an article placement area and an area in front of the article placement area, the method including, by the computer:
    acquiring a first image generated by the first image capture unit and acquiring a second image generated by a second image capture unit;
    generating first size data indicating a size of an area in which an article is captured in the first image and generating second size data indicating a size of an area in which the article is captured in the second image; and
    determining that an estimation result of an article name of the article by image processing using at least one of the first image and the second image is correct when a relation between the first size data and the second size data satisfies a criterion, wherein the first image capture unit, the article placement area, and the second image capture unit are arranged in this order in a first direction.

6. The article determination method according to aforementioned 5, further including, by the computer:

estimating an article name of the article by the image processing before the determination unit determines whether the first size data and the second size data satisfy a criterion; and using the criterion based on an estimation result of an article name of the article.

7. The article determination method according to aforementioned 5 or 6, wherein the first image capture unit is positioned above the article placement area and the second image capture unit is positioned below the article placement area.

8. The article determination method according to any one of aforementioned 5 to 7, wherein the criterion is set by using machine learning.

9. A program used by a computer used with a first image capture unit and a second image capture unit each capturing an image of at least one of an article placement area and an area in front of the article placement area, the program causing the computer to execute:

a function of acquiring a first image generated by the first image capture unit and acquiring a second image generated by a second image capture unit;

a function of generating first size data indicating a size of an area in which an article is captured in the first image and generating second size data indicating a size of an area in which the article is captured in the second image; and a function of determining that an estimation result of an article name of the article by image processing using at least one of the first image and the second image is correct when a relation between the first size data and the second size data satisfies a criterion, wherein the first image capture unit, the article placement area, and the second image capture unit are arranged in this order in a first direction.

10. The program according to aforementioned 9, further causing the computer to:

estimate an article name of the article by the image processing before the determination unit determines whether the first size data and the second size data satisfy a criterion; and use the criterion based on an estimation result of an article name of the article.

11. The program according to aforementioned 9 or 10, wherein the first image capture unit is positioned above the article placement area and the second image capture unit is positioned below the article placement area.

12. The program according to any one of aforementioned 9 to 11, wherein the criterion is set by using machine learning.

REFERENCE SIGNS LIST

10 Article determination apparatus
20 Image capture unit
30 External apparatus
40 Article shelf
42 Front frame
50 Article
110 Acquisition unit
120 Image processing unit
130 Determination unit
132 Criterion storage unit
200 Image capture apparatus
210 Image capturing unit
220 Lighting unit

What is claimed is:

1. An article determination apparatus used with a first image capture unit and a second image capture unit each capturing an image of at least one of an article placement area and an area in front of the article placement area, the article determination apparatus comprising:

at least one memory configured to store instructions; and at least one processor configured to execute the instructions to perform operations comprising:

acquiring a first image generated by the first image capture unit and acquiring a second image generated by the second image capture unit;

generating first size data indicating a size of an area in which an article is captured in the first image and generating second size data indicating a size of an area in which the article is captured in the second image; and determining that an estimation result of an article name of the article by image processing using at least one of the first image and the second image is correct when a relation between the first size data and the second size data satisfies a criterion, wherein the first image capture unit, the article placement area, and the second image capture unit are arranged in this order in a first direction.

2. The article determination apparatus according to claim 1, wherein the operations further comprise estimating an article name of the article by the image processing before determining whether the relation between the first size data and the second size data satisfy the criterion, and determining whether the relation between the first size data and the second size data satisfy the criterion comprises using the criterion based on an estimation result of an article name of the article.

3. The article determination apparatus according to claim 1, wherein the first image capture unit is positioned above the article placement area and the second image capture unit is positioned below the article placement area.

4. The article determination apparatus according to claim 1, wherein the criterion is set by using machine learning.

5. An article determination method executed by a computer used with a first image capture unit and a second image capture unit each capturing an image of at least one of an article placement area and an area in front of the article placement area, the article determination method comprising:

acquiring a first image generated by the first image capture unit and acquiring a second image generated by the second image capture unit;

generating first size data indicating a size of an area in which an article is captured in the first image and generating second size data indicating a size of an area in which the article is captured in the second image; and determining that an estimation result of an article name of the article by image processing using at least one of the first image and the second image is correct when a relation between the first size data and the second size data satisfies a criterion, wherein the first image capture unit, the article placement area, and the second image capture unit are arranged in this order in a first direction.

6. The article determination method according to claim 5, wherein
the article determination method further comprises estimating an article name of the article by the image processing before determining whether the relation between the first size data and the second size data satisfy the criterion, and
determining whether the relation between the first size data and the second size data satisfy the criterion comprises using the criterion based on an estimation result of an article name of the article.

7. The article determination method according to claim 5, wherein
the first image capture unit is positioned above the article placement area and the second image capture unit is positioned below the article placement area.

8. The article determination method according to claim 5, wherein
the criterion is set by using machine learning.

9. A non-transitory storage medium storing a program used by a computer used with first image capture unit and second image capture unit each capturing an image of at least one of an article placement area and an area in front of the article placement area, the program causing the computer to execute an article determination method, the article determination method comprising:
acquiring a first image generated by the first image capture unit and acquiring a second image generated by the second image capture unit;
generating first size data indicating a size of an area in which an article is captured in the first image and generating second size data indicating a size of an area in which the article is captured in the second image; and
determining that an estimation result of an article name of the article by image processing using at least one of the first image and the second image is correct when a relation between the first size data and the second size data satisfies a criterion, wherein
the first image capture unit, the article placement area, and the second image capture unit are arranged in this order in a first direction.

10. The non-transitory storage medium according to claim 9, wherein
the article determination method further comprises estimating an article name of the article by the image processing before determining whether the relation between the first size data and the second size data satisfy the criterion, and
determining whether the relation between the first size data and the second size data satisfy the criterion comprises using the criterion based on an estimation result of an article name of the article.

11. The non-transitory storage medium according to claim 9, wherein
the first image capture unit is positioned above the article placement area and the second image capture unit is positioned below the article placement area.

12. The non-transitory storage medium according to claim 9, wherein
the criterion is set by using machine learning.

* * * * *